United States Patent
Chang et al.

(10) Patent No.: US 10,693,320 B2
(45) Date of Patent: Jun. 23, 2020

(54) WIRELESS CHARGING

(71) Applicant: HEWLETT-PACKARD DEVELOPMENT COMPANY, L.P., Houston, TX (US)

(72) Inventors: Han-Kuang Chang, Taipei (TW); YK Hsieh, Taipei (TW); Chung-Chun Chen, Taipei (TW); Mark Feng, Taipei (TW); David Hsieh, Taipei (TW); Ming-Shien Tsai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/094,689

(22) PCT Filed: Jul. 29, 2016

(86) PCT No.: PCT/US2016/044801
§ 371 (c)(1),
(2) Date: Oct. 18, 2018

(87) PCT Pub. No.: WO2018/022101
PCT Pub. Date: Feb. 1, 2018

(65) Prior Publication Data
US 2019/0148978 A1 May 16, 2019

(51) Int. Cl.
*H02J 50/10* (2016.01)
*H02J 7/00* (2006.01)
(Continued)

(52) U.S. Cl.
CPC .............. *H02J 50/10* (2016.02); *H02J 7/025* (2013.01); *H04B 5/0031* (2013.01); *H04B 5/0037* (2013.01); *H04B 5/0075* (2013.01)

(58) Field of Classification Search
CPC ........ H02J 50/10; H02J 7/025; H04B 5/0031; H04B 5/0037; H04B 5/0075
(Continued)

(56) References Cited

U.S. PATENT DOCUMENTS 8,238,823 B2   8/2012   Maugars et al.
8,946,939 B2   2/2015   Drennen
(Continued)

FOREIGN PATENT DOCUMENTS

WO   WO-2014143104        9/2014
WO   WO-2016187821 A1 * 12/2016 ............... H04B 5/00

OTHER PUBLICATIONS

Kim et al. (Korean Patent Document No. Kr 2015101015 A, published Sep. 3, 2015, abstract and drawing). (Year: 2015).*
(Continued)

*Primary Examiner* — Phallaka Kik
(74) *Attorney, Agent, or Firm* — HPI Patent Department

(57) ABSTRACT

Examples of wireless charging of a computing system are described herein. In an example, a charging notification from a power transmit unit (PTU) in a power transfer field of the computing system may be received. In response to receiving the charging notification, it may be ascertained whether a near field communication (NFC) component of the computing system is in an active state for data communication. When the NFC component is in the active state, an input may be provided to switch the active state of the NFC component to an inactive state for disabling data communication through the NFC component.

15 Claims, 6 Drawing Sheets

(51) Int. Cl.
*H04B 5/00* (2006.01)
*H02J 7/02* (2016.01)

(58) Field of Classification Search
USPC .................................... 320/108, 113, 115
See application file for complete search history.

(56) References Cited

U.S. PATENT DOCUMENTS

| | | | |
|---|---|---|---|
| 9,094,057 B2 | 7/2015 | Low et al. | |
| 9,252,846 B2 | 2/2016 | Lee et al. | |
| 9,281,706 B2 | 3/2016 | McFarthing | |
| 9,727,034 B1 | 8/2017 | Ross et al. | |
| 9,787,363 B2* | 10/2017 | Suzuki | H04B 5/00 |
| 10,404,682 B2* | 9/2019 | Hoyer | H04L 67/02 |
| 2005/0077356 A1* | 4/2005 | Takayama | G06K 7/10237 |
| | | | 235/451 |
| 2008/0299907 A1* | 12/2008 | Takayama | H04B 5/0031 |
| | | | 455/41.2 |
| 2009/0147803 A1* | 6/2009 | Takayama | G06K 7/0008 |
| | | | 370/475 |
| 2010/0194206 A1 | 8/2010 | Burdo et al. | |
| 2012/0309303 A1* | 12/2012 | Hillan | H04B 5/0031 |
| | | | 455/41.1 |
| 2012/0327749 A1 | 12/2012 | Tsukamoto et al. | |
| 2013/0137371 A1* | 5/2013 | Haverinen | H04B 5/02 |
| | | | 455/41.1 |
| 2013/0196594 A1* | 8/2013 | Moosavi | H04B 5/00 |
| | | | 455/41.1 |
| 2013/0281014 A1* | 10/2013 | Frankland | H04B 5/00 |
| | | | 455/41.1 |
| 2014/0021799 A1 | 1/2014 | Sankararamalingam et al. | |
| 2014/0148095 A1* | 5/2014 | Smith | H04B 5/02 |
| | | | 455/41.1 |
| 2014/0187147 A1* | 7/2014 | Rochberger | H04W 8/005 |
| | | | 455/41.1 |
| 2014/0256251 A1* | 9/2014 | Caceres | H04B 5/0031 |
| | | | 455/41.1 |
| 2014/0274014 A1* | 9/2014 | Dodla | H04B 5/0031 |
| | | | 455/418 |
| 2014/0344423 A1 | 11/2014 | Yu et al. | |
| 2015/0001952 A1* | 1/2015 | Chiba | H04B 5/0031 |
| | | | 307/104 |
| 2015/0180268 A1 | 6/2015 | Byun et al. | |
| 2015/0180543 A1* | 6/2015 | Verma | H04B 5/0031 |
| | | | 455/41.1 |
| 2015/0223012 A1* | 8/2015 | Kakarala | H04B 5/0031 |
| | | | 705/26.8 |
| 2015/0280786 A1* | 10/2015 | Bhat | H04B 5/0031 |
| | | | 455/41.1 |
| 2016/0261026 A1* | 9/2016 | Han | H01Q 9/04 |
| 2017/0004538 A1* | 1/2017 | Lee | G06Q 30/0241 |
| 2017/0294798 A1* | 10/2017 | Yuk | H02J 7/025 |
| 2017/0331524 A1* | 11/2017 | Aranyosi | H04B 5/0031 |
| 2018/0005224 A1* | 1/2018 | Binder | G06Q 20/3278 |
| 2018/0131408 A1* | 5/2018 | Austad | G06F 21/606 |
| 2018/0132089 A1* | 5/2018 | Zhao | H04B 5/0025 |
| 2018/0254663 A1* | 9/2018 | Chen | H04B 5/0056 |
| 2020/0045523 A1* | 2/2020 | Zhao | H04B 5/00 |

OTHER PUBLICATIONS

Lu, X. et al., Wireless Charging Technologies: Fundamentals, Standards, and Network Applications, Nov. 14, 2015, <https://arxiv.org/pdf/1509.00940.pdf>.

* cited by examiner

10,693,320 B2

WIRELESS CHARGING

BACKGROUND

Computing devices, such as mobile phones, tablet or handheld computers, digital cameras, notebook computers, or laptops include a rechargeable power source, which may be recharged regularly to replenish depleted energy during course of using such devices. The power source is generally charged using wired connections including charging cords and cables that supply power from a charging device. More recently, the power sources may be provided power over free space through wireless charging.

BRIEF DESCRIPTION OF FIGURES

The following detailed description references the drawings, wherein.

DETAILED DESCRIPTION

Figure 1:
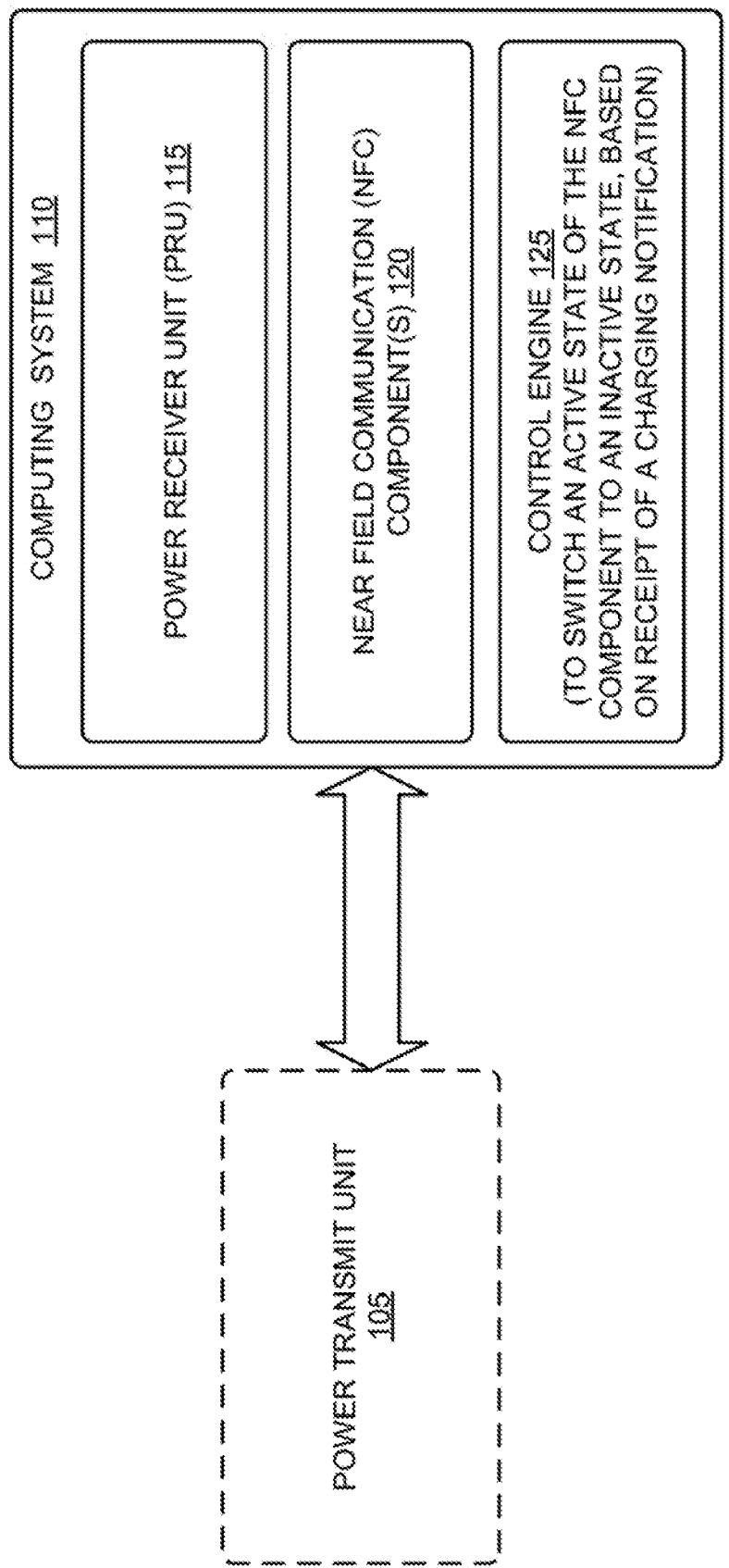
FIG. 1 illustrates a wireless power transfer environment, according to an example implementation of the present subject matter.

Computing devices generally include a power source, such as a battery, which may be recharged time to time to power corresponding computing devices. The power sources within such devices may be charged through wired chargers or through wireless power transmitters. Wireless power transmitters, may transfer energy associated with electric field, magnetic field, or electromagnetic field without using physical mediums, such as cables, wires, and cords. The wireless power transfer provides additional flexibility, portability, and convenience.

The wireless charging, also referred to as wireless power transfer, generally uses inductive coupling to transfer power or to charge computing devices wirelessly. A charging device, which generates and provides the power, referred to as a power transmit unit (PTU), may be used. Examples of the PTUs include, but are not limited to, charging stations, charging mats, and charging pads. Further, a computing device to be charged (referred to as computing device or a target device) receiving the power may include a power receiver unit (PRU). The PRU may in turn charge a power source, or when the power source is charged, may be used to operate the computing device. The PRU may be a separate and an external component or may be integrated within a computing system. To transfer the power, the PTU may generate an alternating electromagnetic field and a PRU in close proximity may couple to the PTU to draw power from the electromagnetic filed. The drawn power may then be electrically rectified by the PRU and used to charge the power source.

The wireless charging does not rely on physical connectors, which not only adds to convenience but may also enhance reliability as the chances of mechanical damage to the cords and cables are minimized. Further, chances of electric failures are also reduced. Also, issues pertaining to compatibility of various cables with a computing system may also be addressed. Moreover, with recent developments in wireless charging technology, efficiency of the wireless charging is expected to be comparable with those of wired charging, thus making wireless charging popular and widely implemented.

Generally, within the computing devices, the wireless charging may co-exist with various other functionalities for wireless communication, such as near field communication (NFC) functionality, of a computing system. Each of these functionalities is implemented by way of its corresponding electronic circuitry or set of components. However, power requirement of the computing system for wireless power transfer may be generally higher than electrical and operational tolerances of NFC components, when such NFC components are active. This results in the NFC components becoming prone to damage during wireless charging.

For instance, the NFC components can withstand a maximum charging voltage of 6 volt (V), and a charging voltage beyond 6V can damage the NFC components. The computing system, such as notebooks and laptops, typically work on a charging voltage about 20V, thereby making the NFC components of such systems prone to damage. As a result, either the NFC components may have to be replaced frequently, thereby increasing maintenance costs, or the use of wireless charging in the computing systems may be restricted, thereby depriving such systems from benefits of wireless charging. It will be appreciated that the voltage ranges provided herein are for reference only and may vary from device to device.

Approaches for wireless charging of computing systems are described herein. In an example, a PTU may transmit a charging notification(s) indicating its availability for wireless charging. Based on receipt of the charging notification, a computing system may detect presence of the PTU in a power transfer field of the computing system. The power transfer field may refer to a region around the computing system, where the computing system may couple with the PTU to receive power.

In response to detection, it may be ascertained whether NFC functionalities of the computing system are enabled or active. For instance, it may be determined whether an NFC component, such as an NFC reader or an NFC antenna are in an active state. When the NFC component is in the active state, an input may be provided to switch the active state to an inactive state to disable NFC functionalities. Thus, during the course of wireless charging, the NFC functionalities may be dynamically disabled to prevent damage to the NFC components.

Further, during wireless charging, if data transfer is to be performed using NFC, the wireless charging may be disabled and the NFC functionality may be enabled. For instance, an NFC device in an NFC field of the computing system may be detected, and in response to the detection, the wireless charging may disabled and the NFC functionalities may be enabled.

Such dynamic switching of states provides for co-existence of the wireless charging and the NFC functionality in the same computing system, without subjecting the NFC components to damage. Further, for toggling between various states, manual inputs may not be required. As a result, switching between the states may be done dynamically, thereby enhancing user experience. Additionally, as the damage to the NFC components is minimized or eliminated, the reliability of the computing system is enhanced and associated maintenance costs may be reduced. Moreover, the present subject matter may be implemented using the available hardware with minimum or no changes. For instance, existing devices, such as PTUs, may be used without any additional modifications, thereby making the present technique easy to implement and cost effective.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a wireless power transfer environment 100, according to an example implementation of the present subject matter. Wireless power transfer, also referred to as wireless charging, may include energy transfer associated with electric fields, magnetic fields, or electromagnetic fields, and such power transfer may be performed from a transmitter, such as a power transmit unit 105, to a receiver, such as a computing system 110 without using physical connections. The power transfer may be performed wirelessly over free space using, for instance, electromagnetic or inductive coupling.

In an example, the computing system 110 may include a power source (shown in FIG. 2), which may be regularly charged to power the computing system 110. However, it will be appreciated, in other examples, the power source may an external power component, which may be recharged via the computing system 110. The computing system 110, in addition to the power source, may include other components, such as a power receiver unit (PRU) 115, NFC component(s) 120, and a control engine 125.

To provide for wireless transfer of power, the PRU 115 may detect the PTU 105 in the power transfer field of the PRU 115 (or the computing system 110). In an example, the PTU 105 may regularly transmit a charging notification indicating its availability for wireless power transfer. The PRU 115 may receive the charging notification transmitted by the PTU 115, when present in the power transfer field of the PRU 115. Thus, receipt of the charging notification may confirm presence of the PTU 105. In an example, the PRU 115 may communicate with the PTU using Bluetooth low energy (BTLE/BLE) protocol. However, other control signal protocols may also be used for communication between the PRU 115 and the PTU 105, without deviating from the scope of the present subject matter.

The PRU 115, in response to detection of the charging notification, may provide a control input to the control engine 125. The control engine 125, on receiving the control input indicating availability of the PTU 105, may ascertain whether the NFC components 120, such as an NFC reader and an NFC antenna, are in an active state to perform data exchange with another computing device. When the NFC components 120 are active, the control engine 125 may provide for switching of the active state to an inactive state to disable NFC functionalities, thereby preventing the active NFC components from being damaged during wireless charging. In one example, the control engine 125 may generate one or more control instructions for controlling the active state of the NFC components 120.

Subsequently, the PRU 115 may couple with the PTU 105 through their respective components, such as coils and rectifiers, to receiver power. For instance, the PTU 105 may generate an electromagnetic filed to transfer power. The PRU 115 may couple with the PTU 105 through the electromagnetic field to draw energy (power) from the electromagnetic filed for storage or for powering the computing system 110. This way the wireless charging may co-exist with the NFC functionality in the same computing system 110 without damaging the active NFC components 120, which in turn may enhance the reliability of the wireless charging technique.

Figure 2:
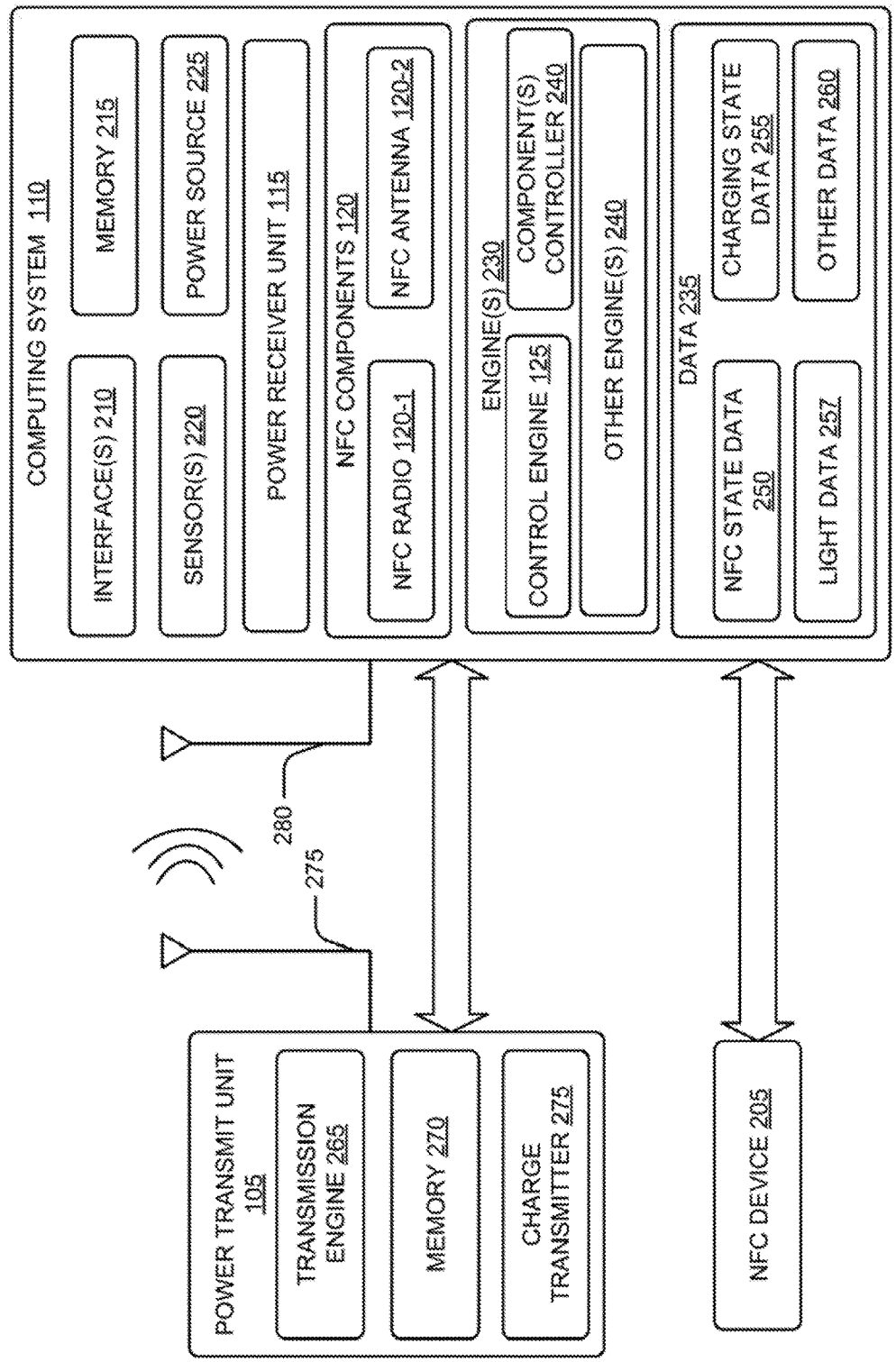
FIG. 2 illustrates various components of a computing system wirelessly coupled to a power transmit unit, according to an example implementation of the present subject matter.

The above aspects and further details are provided in conjunction with FIG. 2. FIG. 2 illustrates various components of the computing system 110 and the PTU 105, according to another example implementation of the present subject matter. In FIG. 2, the computing system 110 may be wirelessly coupled to other devices, such as the PTU 105 or an NFC device 205. The computing system 110 may be a portable computing system. In an example, the computing system 110 may a computing system having a voltage rating of more than 6V, such as a notebook and a laptop.

In the present example, the computing system 110 includes interface(s) 210, memory 215, sensor(s) 220, a power source 225, the PRU 115, the NFC components 120, engine(s) 230, and data 235. The interface(s) 210 may include a variety of interfaces, for example, interfaces for data input and output devices, referred to as I/O devices, storage devices, network devices, and the like. The interface(s) 210 facilitate communication between the computing system 110 and various computing devices connected in a networked environment, or also with the PTU 105 and the NFC device 205.

The memory 215 may store one or more computer-readable instructions, which may be fetched and executed so as to implement functionalities of the engine(s) 230. The memory 215 may be any non-transitory computer-readable medium including, for example, volatile memory such as RAM, or non-volatile memory such as EPROM, flash memory, and the like.

The computing system 110 may further include engine(s) 230 and data 235. The engine(s) 230 may be implemented as a combination of hardware and programming (for example, programmable instructions) to implement one or more functionalities of the engine(s) 230. In examples described herein, such combinations of hardware and programming may be implemented in a number of different ways. For example, the programming for the engine(s) 230 may be processor executable instructions stored on a non-transitory machine-readable storage medium and the hardware for the engine(s) 230 may include a processing resource (for example, one or more processors), to execute such instructions. In the present examples, the machine-readable storage medium may store instructions that, when executed by the processing resource, implement engine(s) 230. In such examples, the computing system 110 may include the machine-readable storage medium storing the instructions and the processing resource to execute the instructions, or the machine-readable storage medium may be separate but accessible to the computing system 110 and the processing resource. In other examples, engine(s) 230 may be implemented by electronic circuitry.

In an example, the engine(s) 230 include the control engine 125, a component(s) controller 240, and other engine(s) 245. The control engine 125 may be implemented, for instance, by way of an embedded controller, and the component controller 240 may be implement basic input output control (BIOS) control of the computing system 110. The other engine(s) 245 may implement functionalities that supplement applications or functions performed by the computing system 110. The data 235 includes data that is either predefined or generated as a result of the functionalities implemented by any of the engine(s) 230. In one example, the data 235 may include NFC state data 250, charging state data 255, light data 257, and other data 260.

In an example, the PTU 105 may function as a wireless transmitter to provide power to the PRU 115 in a close vicinity. The PTU 105 may be, for instance, a charging pad, a charging station, or a charging mat. The PTU 105 may include, amongst other things, a transmission engine 265, memory 270, and a charge transmitter 275. The transmission engine 265 may function as the engine(s) 230 and the memory 270 may be similar to the memory 215. The transmission engine 265 may regularly generate and transmit the charging notifications through a transmitter antenna 275. The charging notification may indicate PTU's availability to transfer power to PRUs in close proximity.

The charging notification may be received by a receiver antenna 280 of the computing system 110, when the PTU 105 is in the wireless power transfer field of the PRU 115. In an example, the receiver antenna 280 may be a component of the PRU 115, while in other examples, it may be exterior to the PRU 115. Further, the power transfer field of the PRU 115 may be understood to be region around the PRU 115, where the PRU 115 may interact with the PTU 105 to receive power and notifications, such as the charging notifications.

On receiving the charging notification, the PRU 115 may provide a control input to the control engine 125 indicating presence of the PTU 105 in the power transfer field. The control engine 125, in response to receiving the control input, may ascertain whether the NFC components 120, such as an NFC reader 120-1 and an NFC antenna 120-2, are in an active state. Details pertaining to various NFC components 120 may be stored in the NFC data 250. Accordingly, the control engine 125, based on the NFC data 250, may determine a current state of the NFC components 120.

In case it is determined that the NFC components 120 are in the active state and are enabled to perform data exchange, the control engine 125 may provide a control input to the component input output engine 240 to switch the active state of the NFC components 120 to an inactive state, thereby disabling NFC functionalities. The change in the NFC state may be updated in the NFC state data 250 by the control engine 125. Further, in an example, the control engine 125 may also provide a visual indicator to indicate to a user that the NFC functionalities are disabled. For instance, the control engine 125 may turn off a light emitting diode or change the color, say, from green to red.

On disabling the NFC components 120, the control engine 125 may provide a notification to the PRU 115 to initiate wireless charging process. In response to the notification, the PRU 115 through a corresponding charge receiver (not shown in figures) may couple to the electromagnetic field generated by the charge transmitter 275 of the PTU 105. For the sake of brevity, various components, such as coils, coupling circuitry, rectifiers, filters, and bridges, of the charge receiver and the charge transmitter 275 are not illustrated in the figures.

Once the PRU 115 couples with the PTU 105, the charge receiver may draw power from the field generated by the charge transmitter 275. In an example, the power generated by charge transmitter 275 may correspond to a charging voltage of about 20V. However, in other examples, the charging voltage may vary based on power requirements of the computing system 110. The received power may be further processed, for example, rectified and filtered to enhance efficiency.

The received power may then be used to charge the power source 225 to run various components of the computing system 110. The power source 225 may be charged regularly to replenish depleted energy. The power source 225 may be, for example, a rechargeable battery, capable of being charged using wireless charging as well as wired charging.

Thus, according to an aspect of the present subject matter, while wireless charging is enabled, the NFC components 120 are disabled to prevent damage to the NFC components 120.

In an example, to switch an active wireless charging mode to the inactive one, the PRU 115 may provide a control input to the control engine 125. The wireless charging may be ceased or discontinued due to various reasons, for instance, when PTU 105 moves out of the power transfer field, when PTU 105 indicates low power, when the computing system 110 is fully charged, or when the NFC device 205 is detected in the close vicinity. Each of these example scenarios are described in paragraphs below.

As will be appreciated, for wireless charging, the PTU 105 is to be present in the power transfer filed of the computing system 110. Thus, when the PTU 105 or the PRU 115 (i.e., the computing system 110) is moved, it may result in the PTU 105 being moved outside the power transfer field of the computing system 110. As a result, inductively coupled the PTU 105 and the PRU 115 may now uncouple, and the absence of the PTU 105 from the power transfer field may be detected by the PRU 115. In said example, owing to uncoupling the wireless charging may cease and the PRU 105 may provide the control input to the control engine 125 to disable the wireless charging and enable the NFC functionalities.

In another example, to disable wireless charging, the PTU 105 may provide a notification to the PRU 115 indicating low power. In yet another example, when the computing system 110 is fully charged, the PRU 115 may provide a notification to the PTU 105 indicating that further charging is not required. As mentioned above, the PRU 105 may provide the control input to the control engine 125 to disable the wireless charging and enable the NFC functionalities.

The control engine 125 may enable the NFC functionalities by proving an input to the component controller 240, which in turn may switch the inactive state of the NFC components 120 to the active state. Further, the control engine 125 may also appropriately change the visual indicator to indicate the active state of the NFC components 120.

The wireless charging may also disabled in cases where a user requests to use data communication using NFC or when the NFC device 205, such as an NFC card or an NFC tag is detected in the NFC field of the computing system. Since, the NFC components 120, such as the NFC reader 120-1 may be disabled, the NFC device 205 in the NFC field of the computing system 110 may be detected using sensor(s) 220. The sensor 220 may include, for instance, a light sensor to detect the NFC device 205 requesting for data communication.

In an example, the light sensor may obtain information pertaining to light reflected from the NFC device 205, which may be compared with ambient light conditions of the computing system 110 to detect that the NFC device 205 is in the close proximity. Thus, the ambient light conditions may be used to determine proximity between the two devices. In other examples, other sensors may be used to detect the NFC device 205 or the light sensor may implement other techniques to detect the NFC device 205, without deviating from the scope of the present subject matter In one example, the NFC device 205 may be an electronic wallet in a smart phone or an NFC enabled credit card, which when brought close to the computing system 110 may be detected by the sensor 220. On detecting the NFC device 205, the sensor 220 may provide an NFC detection input to the control engine 125 indicating that data communication using the NFC is to be enabled. In response to the control input, the control engine 125 may provide an input to the PRU 115 to deactivate the wireless charging. The PRU 115 in turn may provide a notification to the PTU 105 to discontinue the wireless charging.

The control engine 125 may also provide an input to the component controller 240 to switch the inactive state of the NFC components 120 to the active state for enabling data communication with the NFC device 205. The control engine 125 may also accordingly set the visual indicator, based on a current state of the NFC components 120. The current state of the NFC components 120 and a current wireless charging mode may also be updated in the NFC data 250 and the charging state data 245, respectively.

Once the NFC functionality is enabled and the wireless charging is disabled, the NFC components 120 may communicate with the NFC device 205. Thus, this way a user of the computing device 110 may benefit from both the technologies, i.e., the NFC technique and the wireless charging technique without damaging components or compromising on reliability and convenience.

In another example of the present subject matter, the sensor 220 may also detect ambient light conditions. The ambient light conditions may be compared with a threshold value to detect darkness by the control engine 125. The threshold value of the light conditions may be stored in the light data 257. Thus, the ambient light conditions being less than the threshold value may indicate darkness in an area around the computing system 110. Further, in response to detection of darkness, it may be ascertained whether a display unit (not shown in the figures) is inactive, using display unit state data, which may be stored in the other data 260.

In case it is ascertained that the display unit is inactive, the control engine 125 may disable the NFC functionality to prevent light sensor mis-action. It will be appreciated that if the NFC components 120 are already in the inactive state, the state may be maintained. Further, the wireless charging mode of the computing system may be enabled to perform wireless charging, in case the PTU 105 is detected in the power transfer field. Further, if the display unit is active, the control engine 125 may not perform any action and all the components may continue to be in the previous state.

Figure 3:
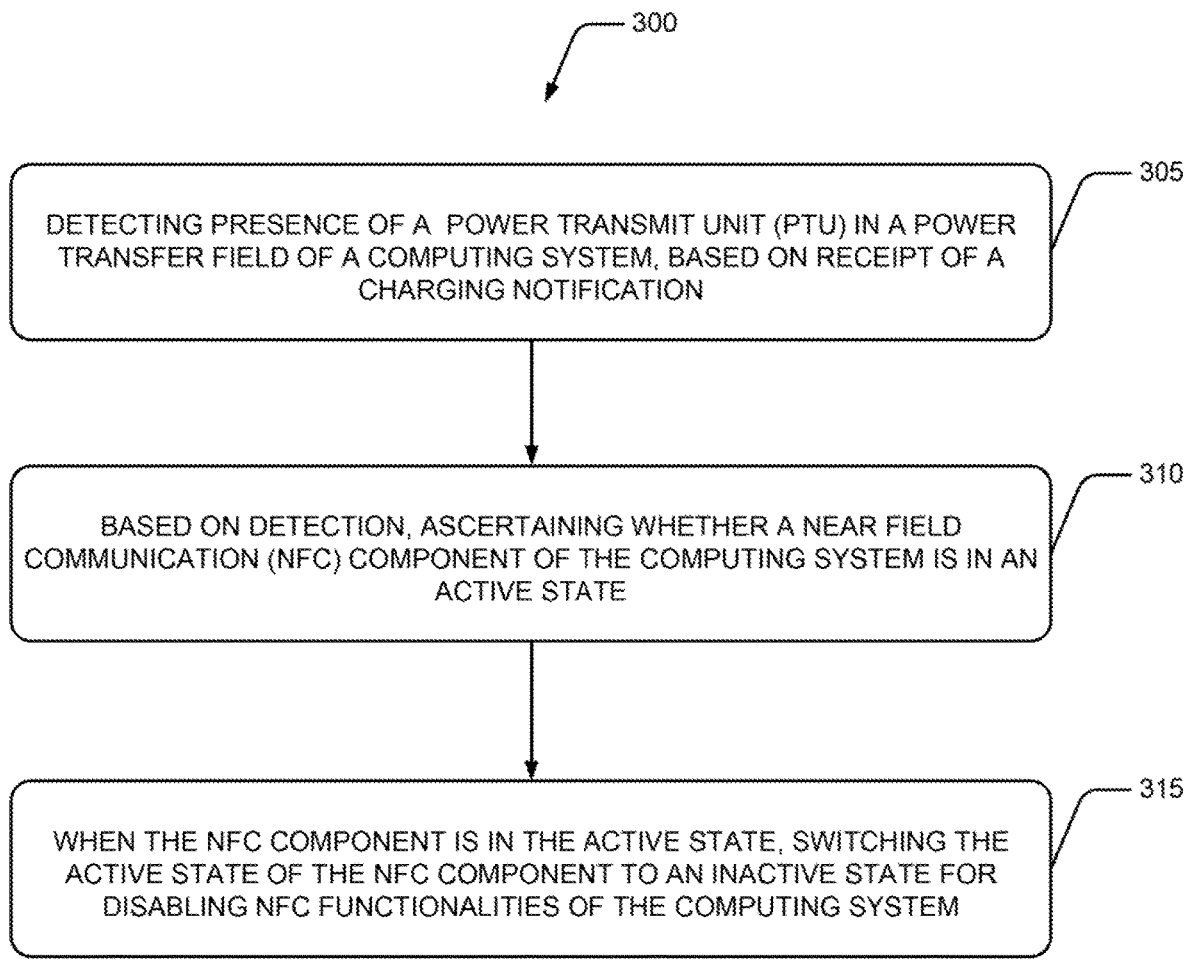
FIG. 3 illustrates a method to wirelessly power a computing system, according to an example implementation of the present subject matter.
Figure 4:
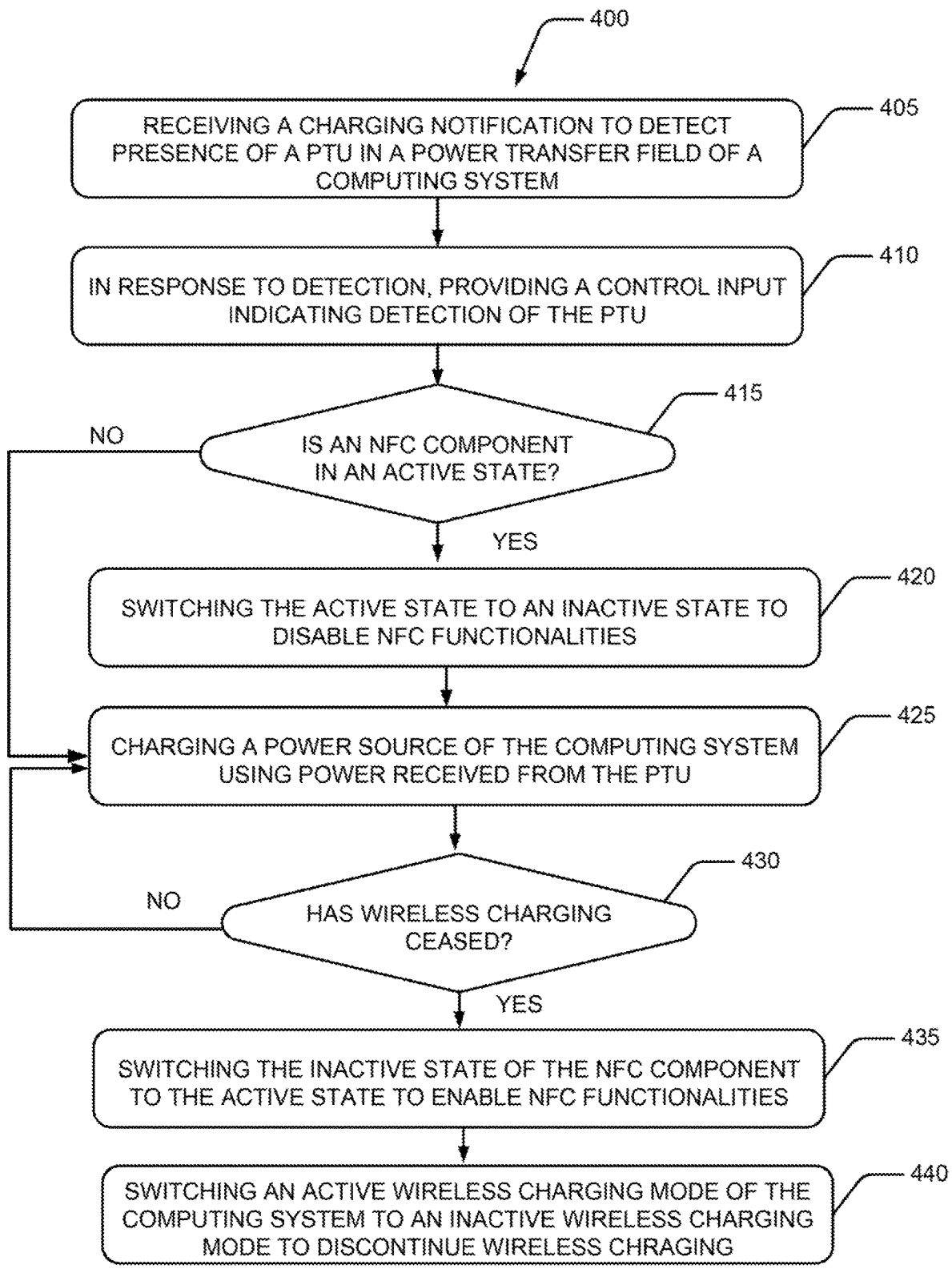
FIG. 4 illustrates a method to wirelessly power a computing system, according to another example implementation of the present subject matter
Figure 5:
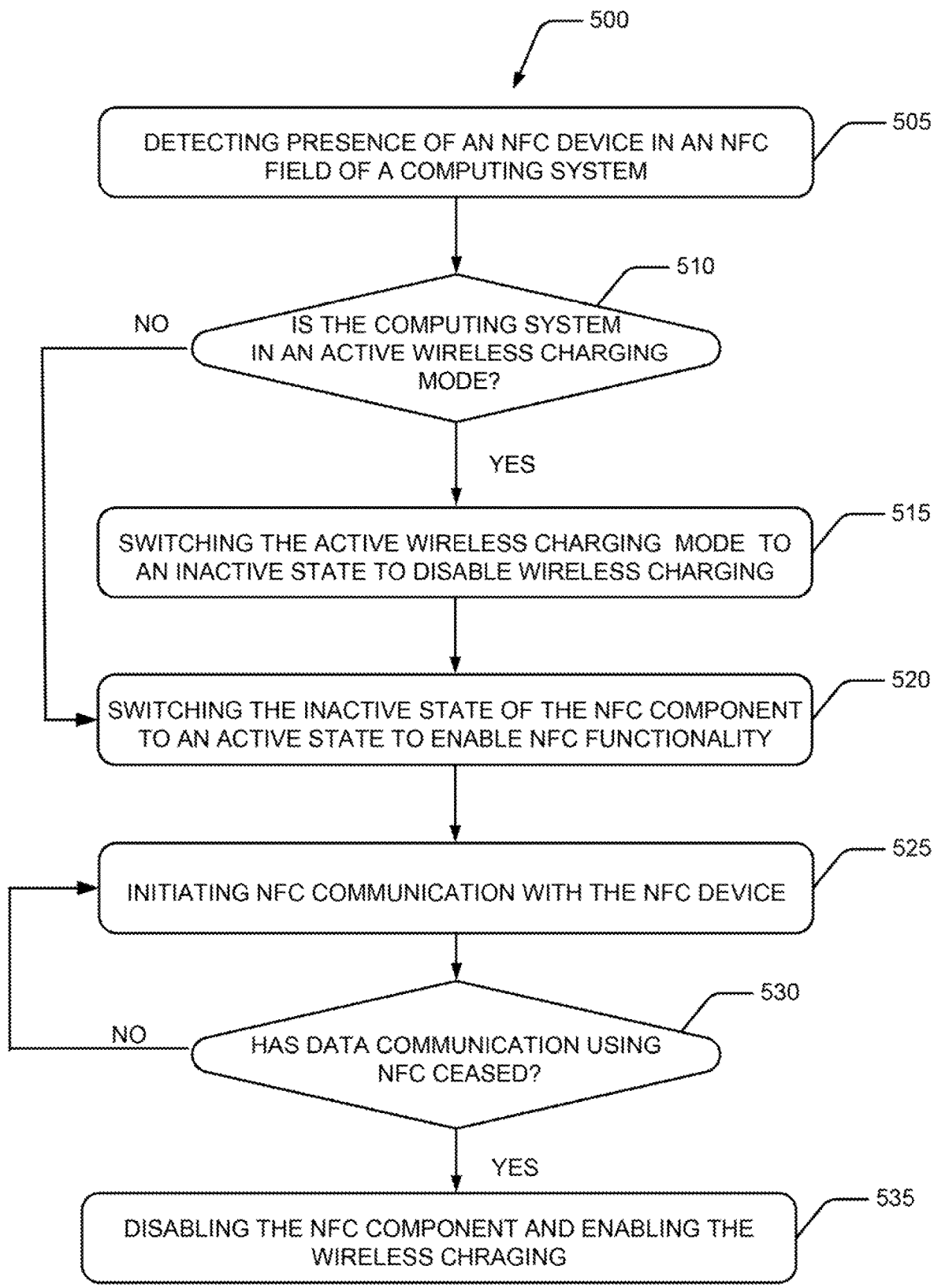
FIG. 5 illustrates a method to implement NFC functionality in a computing system, according to an example implementation of the present subject matter.

Methods 300, 400, and 500 are described in FIG. 3, FIG. 4, and FIG. 5, respectively, for wireless charging of a computing system, according to an example implementation of the present subject matter. The order in which the methods 300, 400, and 500 are described is not intended to be construed as a limitation, and any number of the described method blocks can be combined in any appropriate order to execute the methods 300, 400, and 500 or an alternative method. Additionally, individual blocks may be deleted from the 300, 400, and 500 without departing from the spirit and scope of the subject matter described herein.

The methods 300, 400, and 500 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

The methods 300, 400, and 500 may be performed by a computer based system, such as the computing system 110. For the sake of brevity of description of FIG. 3, FIG. 4, and FIG. 5, the components of the computing system 110 performing the various steps of the methods 300, 400, and 500 are not described in detail with reference to FIG. 3, FIG. 4, and FIG. 5. Such details are provided in the description provided with reference to FIG. 1 and FIG. 2.

Referring to FIG. 3, at block 305, presence of a power transmit unit in a power transfer field of a computing system may be detected. The power transmit unit may be detected, based on receipt of a charging notification transmitted by the power transmit unit. In an example, the PRU 115 of the computing system 110 may receive the charging notification transmitted by the PTU 105 in the power transfer field of the power transfer field.

At block 310, based on the detection, it may be ascertained whether an NFC component of the computing system is in an active state. For instance, the control engine 125, based on the NFC state data 250, may ascertain if the NFC component(s) 120 is in the active state to perform data communication.

At block 315, when the NFC component is in the active state, the active state of the NFC component may be switched to an inactive state to disable NFC functionalities of the computing system. In an example, the component controller 240 may switch the active state to the inactive state, thereby deactivating NFC functionalities during the course of wireless charging.

Referring to FIG. 4, the method 400 describes a process for wireless charging of the computing system, such as the computing system 110 having the NFC components, according to an example implementation of the present subject matter.

At block 405, a charging notification may be received. The charging notification may be indicative of availability of a PTU in the power transfer field of the computing system. Further, based of receipt of the charging notification, the PTU may be detected to be in the power transfer field. For example, on receiving the charging notification from the PTU 105, the PRU 115 may determine that PTU 105 is present in the power transfer field of the computing system 110.

At block 410, in response to detection, a control input indicating the detection of the PTU may be provided. In an example, the PRU 115, on detecting the PTU 105 in the power transfer filed, may provide a control input to the control engine 125. The control input may indicate detection of the PTU 105.

At block 415, it may be ascertained whether an NFC component is in an active state. In an example, the control engine 125 may determine a current state of the NFC component 120, based on the NFC state data 250. In case it is ascertained the NFC component is in the active state, ('YES' branch from block 415), the active state of the NFC component 120 may be switched to an inactive state to disable NFC functionalities so that wireless charging may be performed without damaging the NFC components. However, if at block 415 it is ascertained that the NFC component is not in the active state ('NO branch from block 415), wireless charging of a power source of the computing system using the power received from the PTU via the PRU is initiated as illustrated at block 425.

At block 430, it is ascertained whether the wireless charging is being performed. In an example, the PRU 115 may determine if the wireless charging is being performed. The wireless charging may cease owing to various reasons, such as, when the PTU 105 is no longer in the power transfer field of the PRU 115, the PTU 105 has low power, or the power source being charged by the PRU 115 is fully charged. In case it is ascertained that the wireless charging is being performed, the same may be continued ('YES' branch from block 430). However, in case it is ascertained that the wireless charging is not being performed ('NO' branch from block 430), the in active state of the NFC component may be switched to the active state, thereby enabling NFC functionalities, as illustrated at block 435.

At block 440, an active wireless charging mode of the computing system may be switched to an inactive wireless charging mode to discontinue wireless charging. Thus, the NFC components may not be unnecessarily disabled, when wireless charging is not being performed.

Referring to FIG. 5, the method 500 describes a process for implementing the NFC functionalities in the computing system, which is capable of wireless charging, according to an example implementation of the present subject matter.

At block 505, presence of an NFC device in an NFC field of the computing system is detected. In an example, a light sensor, such as the sensor 220 may detect the NFC device 205 in the NFC field. Further, the light sensor may detect the NFC device 205, when the NFC components 120 are in the inactive state.

At block 510, it may be ascertained whether the computing system is an active wireless charging mode. In an example, the control engine 125 may determine a current wireless charging mode, based on the charging state data 255. In case it is ascertained that the computing system is in the wireless charging mode ('YES' branch from block 510), the active wireless charging mode of the computing system may be switched to the inactive mode to disable the wireless charging, as illustrated at block 515. However, in case the computing system is already in the inactive wireless charging mode, ('YES' branch from block 510) the inactive state of the NFC component may be switched to an active state to enable NFC functionalities, as illustrated at block 520. In an example, the control engine 125 may provide an input to the component controller 240 to switch the NFC states.

At block 525, data communication between the NFC components and the NFC device may be initiated. In an example, as the NFC components 120 may be active, these components may accordingly interact with the NFC device 205.

At block 530, it may be ascertained whether the data communication using the NFC has ceased. The data communication may cease owing to multiple reasons, for instance, due to loss of communication link or on completion of data communication. In an example, the control engine 125 may ascertain whether the data communication has ceased, based on an input received from the NFC component 120. In case it is ascertained that the data communication has ceased, ('YES' branch from block 530), the NFC component may be disabled and the active wireless charging mode may be triggered, as illustrated at block 535. Otherwise, the data communication using the NFC may continue.

In another example, ambient light conditions around the computing system may also be detected. Further, when the ambient light conditions are determined to be less than a threshold, it may be further ascertained, whether a display unit of the computing system 110 is active. In case it is determined that the display unit is not active, the NFC components 120 may be disabled and the wireless charging may be enabled. It will be appreciated, as the ambient light conditions change and become greater than the threshold, activation or deactivation of NFC functionalities and the wireless charging may be determined based on presence of an NFC device 205, the PTU 105, or user preference.

Figure 6:
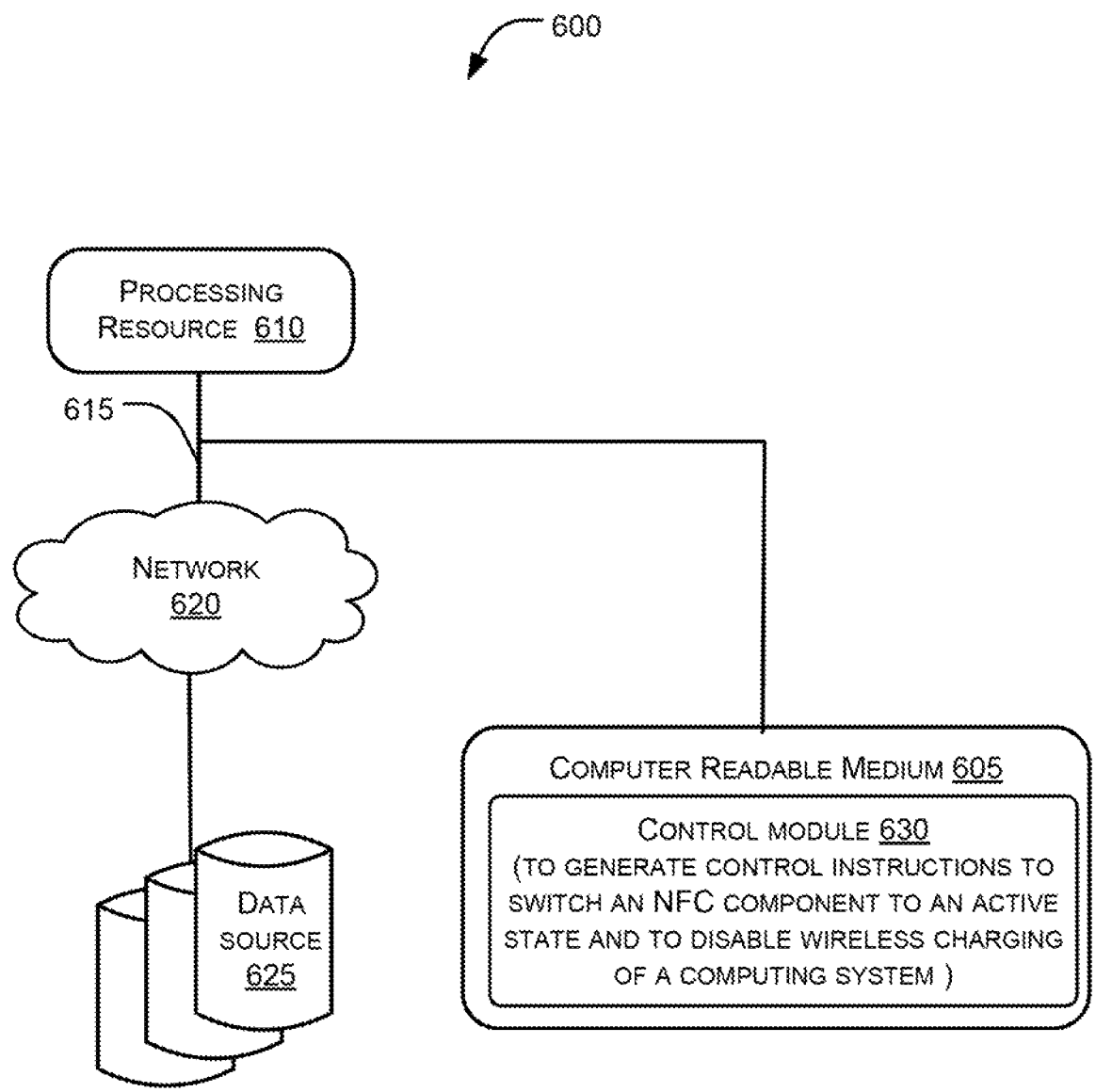
FIG. 6 illustrates a network environment to provide for wireless charging of a computing system, according to an example implementation of the present subject matter.

FIG. 6 illustrates an example network environment 600 using a non-transitory computer readable medium 605 for replicating memory volumes, according to an example implementation of the present subject matter. The network environment 600 may be a public networking environment or a private networking environment. In one example, the network environment 600 includes a processing resource 610 communicatively coupled to the non-transitory computer readable medium 605 through a communication link 615.

For example, the processing resource 610 can be a processor of a computing system, such as the computing system 110. The non-transitory computer readable medium 605 can be, for example, an internal memory device or an external memory device. In one example, the communication link 615 may be a direct communication link, such as one formed through a memory read/write interface. In another example, the communication link 615 may be an indirect communication link, such as one formed through a network interface. In such a case, the processing resource 610 can access the non-transitory computer readable medium 605 through a network 620. The network 620 may be a single network or a combination of multiple networks and may use a variety of communication protocols.

The processing resource 610 and the non-transitory computer readable medium 605 may also be communicatively coupled to data sources 625 over the network 620. The data sources 625 can include, for example, databases and computing devices. The data sources 625 may be used by the database administrators and other users to communicate with the processing resource 610.

In one example, the non-transitory computer readable medium 605 includes a set of computer readable instructions such as a control module 125. As would be understood, the control module 125 implements the functionality of the control engine 125. The set of computer readable instructions, referred to as instructions hereinafter, can be accessed by the processing resource 610 through the communication link 615 and subsequently executed to perform acts for wireless charging.

For discussion purposes, the execution of the instructions by the processing resource 610 has been described with reference to various components introduced earlier with reference to the description of FIGS. 1 and 2.

On execution by the processing resource 610, the control module 630 may, for a received NFC detection input indicating detection of an NFC device, such as the NFC device 205 in an NFC field of the computing system 110, ascertain whether the computing system 110 is in an active wireless charging mode. A current charging mode of the computing system 110 may be determined using the charge state data 255. Further, in response to the computing system 110 being in the active wireless charging mode, the control module 630 may generate control instructions to switch the active wireless charging mode to an inactive mode to disable wireless charging. Furthermore, another control instruction may be generated to switch the inactive state of the NFC component 120 to an active state for enabling NFC functionalities of the computing system 110.

In an example, the control module 630, for a received input indicating presence of a power transmit unit (PTU) in a power transfer field of the computing system 110, ascertain whether the NFC component 120 is in the active state. When the NFC component is in the active state, the control module 630 may provide control instructions to switch the active state of the NFC component to the inactive state for disabling NFC functionalities of the computing system.

In another example, the control module 630, for a received input indicating that the wireless charging is not being performed, may provide control instructions switch the inactive state of the NFC component to the active state. Further, the control module 630 may also generate control instructions to switch the active wireless charging mode of the computing system to the inactive charging mode.

Although examples for wireless charging have been described in language specific to structural features and/or methods, it is to be understood that the appended claims are not limited to the specific features or methods described. Rather, the specific features and methods are disclosed as examples for the wireless charging.

We claim:

1. A computing system comprising:
   a power receiver unit (PRU) to receive a charging notification from a power transmit unit (PTU) in a power transfer field of the computing system; and
   a control engine coupled to the PRU, wherein the control engine is to,
     ascertain, in response to receiving the charging notification, whether a near field communication (NFC) component of the computing system is in an active state in which data communication through the NFC component is enabled; and
     in response to ascertaining that the NFC component is in the active state responsive to receiving the charging notification, provide an input to switch the NFC component to an inactive state for disabling the data communication through the NFC component while wireless charging of the computing system is occurring via the PRU wirelessly receiving power from the PTU.

2. The computing system as claimed in claim 1, wherein the PRU is to,
   detect discontinuation of the wireless charging; and
   in response to detecting, generate a control input to the control engine to switch the inactive state of the NFC component to the active state.

3. The computing system as claimed in claim 1, wherein the computing system comprises a light sensor, wherein the light sensor to:
   detect presence of an NFC device in an NFC field of the computing system; and
   in response to detecting presence of the NFC device, provide an NFC detection input to the control engine to further generate a control input to the PRU to disable wireless charging.

4. The computing system as claimed in claim 3, wherein the control engine is to:
   obtain ambient light conditions;
   in response to the ambient light conditions being less than a threshold, determine whether a display unit of the computing system is inactive; and
   when the display unit is inactive, provide an input to further:
     switch the active state of the NFC component to the inactive state; and
     switch the inactive wireless charging mode of the computing system to the active charging mode.

5. The computing system as claimed in claim 1, wherein the computing system has a voltage rating greater than 6 V.

6. The computing system as claimed in claim 1, wherein the PRU communicates with the PTU using Bluetooth low energy protocol.

7. A method for wireless powering of a computing system, the method comprising:
   detecting a power transmit unit (PTU) is in a power transfer field of the computing system, based on a receipt of a charging notification from the PTU;
   in response to detecting that the PTU is in the power transfer field, ascertaining whether a near field communication (NFC) component of the computing system is in an active state in which NFC functionalities of the computing system are enabled; and
   in response to ascertaining that the NFC component is in the active state responsive to detecting that the PTU is in the power transfer field, switching the NFC component to an inactive state for disabling the NFC functionalities of the computing system while wireless charging of the computing system is occurring via the computing system wirelessly receiving power from the PTU.

8. The method as claimed in claim 7, wherein the method further comprises coupling a power receiver unit (PRU) of the computing system with the PTU to receive power having a predetermined charging voltage, based on a voltage rating of the computing system, and wherein the voltage rating is greater than 6V.

9. The method as claimed in claim 7, wherein the method further comprises:
   determining, when the NFC component is in the inactive state, whether the wireless charging has ceased; and
   when the wireless charging is ceased, switching the inactive state of the NFC component to the active state.

10. The method as claimed in claim 7, wherein the method further comprises
    detecting presence of an NFC device in an NFC field of the computing system, when the computing system is in wireless charging mode and the NFC is in the inactive state; and
    in response to detecting, switching the active wireless charging mode to the inactive charging mode to disable the wireless charging and switching the inactive state of the NFC component to the active state to enable the NFC functionalities.

11. The method as claimed in claim 7, wherein the method further comprises:
    detecting ambient conditions;
    in response to the ambient light conditions being less than a threshold, determining whether a display unit of the computing system is inactive; and
    when the display unit is inactive, maintaining the inactive state of the NFC component and an active wireless charging mode of the computing system.

12. A non-transitory computer readable medium having a set of computer readable instructions that, when executed, cause a processor to:
    in response to an NFC detection input indicating detection of an NFC device in an NFC field of a computing system, ascertain whether the computing system is in an active wireless charging mode in which wireless charging of the computing system is occurring; and in response to ascertaining that the computing system is in the active wireless charging mode responsive to the NFC detection input, generate control instructions to, switch the computing system to an inactive wireless charging mode to disable wireless charging of the computing system; and switch an NFC component of the computing system from an inactive state in which data communication through the NFC component is disabled to an active state in which the data communication through the NFC component is enabled.

13. The non-transitory computer readable medium as claimed in claim 12, wherein the computer readable instructions, when executed, further cause the processor to:

for a received input indicating that ambient light conditions are less than a threshold; determine whether a display unit of the computing system is inactive; and when the display unit is inactive, provide control instructions to, switch the NFC component to the inactive state; and switch the computing system to the active wireless charging mode.

14. The non-transitory computer readable medium as claimed in claim 12, wherein the computer readable instructions, when executed, further cause the processor to:

for a received input indicating presence of a power transmit unit (PTU) in a power transfer field of the computing system, ascertain whether the NFC component of the computing system is in the active state; and when the NFC component is in the active state, provide control instructions to switch the NFC component to the inactive state for disabling the data communication through the NFC component of the computing system.

15. The non-transitory computer readable medium as claimed in claim 14, wherein the computer readable instructions, when executed, further cause the processor to:

for a received input indicating that the wireless charging has ceased, provide control instructions to, switch the computing system to the inactive wireless charging mode; and switch the NFC component to the active state.

* * * * *